United States Patent
Pelrine et al.

(10) Patent No.: US 11,835,711 B2
(45) Date of Patent: Dec. 5, 2023

(54) POINTING APPARATUSES AND METHODS INVOLVING MAGNETIC-CONTRAST BEARINGS

(71) Applicant: SRI International, Menlo Park, CA (US)

(72) Inventors: Ronald Pelrine, Longmont, CO (US);
Nicole Heidel, Alexandria, VA (US);
Jesse Wodin, Denver, CO (US);
Annjoe Wong-Foy, Pacifica, CA (US)

(73) Assignee: SRI International, Menlo Park, CA (US)

( * ) Notice: Subject to any disclaimer, the term of this patent is extended or adjusted under 35 U.S.C. 154(b) by 667 days.

(21) Appl. No.: 16/854,488

(22) Filed: Apr. 21, 2020

(65) Prior Publication Data

US 2020/0333584 A1   Oct. 22, 2020

Related U.S. Application Data

(60) Provisional application No. 62/836,854, filed on Apr. 22, 2019.

(51) Int. Cl.
*G02B 26/08* (2006.01)
*G02B 26/10* (2006.01)
*H02N 15/00* (2006.01)
*H04B 10/27* (2013.01)

(52) U.S. Cl.
CPC ......... *G02B 26/085* (2013.01); *G02B 26/101* (2013.01); *H02N 15/00* (2013.01); *H04B 10/27* (2013.01)

(58) Field of Classification Search
CPC .... G02B 26/085; G02B 26/101; H02N 15/00; H04B 10/27
See application file for complete search history.

(56) References Cited

U.S. PATENT DOCUMENTS

| | | | | |
|---|---|---|---|---|
| 5,466,070 A | * | 11/1995 | Nakasugi | B41J 2/471 384/112 |
| 7,388,700 B1 | * | 6/2008 | Odhner | G02B 7/1821 359/224.1 |
| 2018/0267294 A1 | * | 9/2018 | Aschwanden | H02K 33/00 |

OTHER PUBLICATIONS

Brodkin, Jon. "SpaceX plans worldwide satellite Internet with low latency, gigabit speed." Ars Technica, Nov. 17, 2016, 6 pages, retrieved Mar. 10, 2020, <https://arstechnica.com/information-technology/2016/11/spacex-plans-worldwide-satellite-internet-with-low-latency-gigabit-speed/>.

Kramer, Jeff and Henderson, David. "Micro Beam Steering: Precision micro beam-steering systems simplify move to handheld instruments." Laser Focus World, Jul. 10, 2015, 17 pages, retrieved Mar. 10, 2020, <https://www.laserfocusworld.com/software-accessories/positioning-support-accessories/article/16551608/micro-beam-steering-precision-micro-beamsteering-systems-simplify-move-to-handheld-instruments>.

Visible Light Communication, retrieved Mar. 10, 2020, 6 pages, <http://www.marketsandmarkets.com/PressReleases/visible-light-communication.asp>.

* cited by examiner

*Primary Examiner* — Euncha P Cherry
(74) *Attorney, Agent, or Firm* — Dicke, Billig & Czaja, PLLC

(57) ABSTRACT

An example apparatus includes a pointing structure, a magnetic-contrast bearing, and drive circuitry. The magnetic-contrast bearing is coupled to the pointing structure, and includes a magnetic array and a substrate that is arranged with the magnetic array. The drive circuitry generates a magnetic field that interacts with the magnetic array and causes control of a pointing position of the pointing structure.

20 Claims, 10 Drawing Sheets

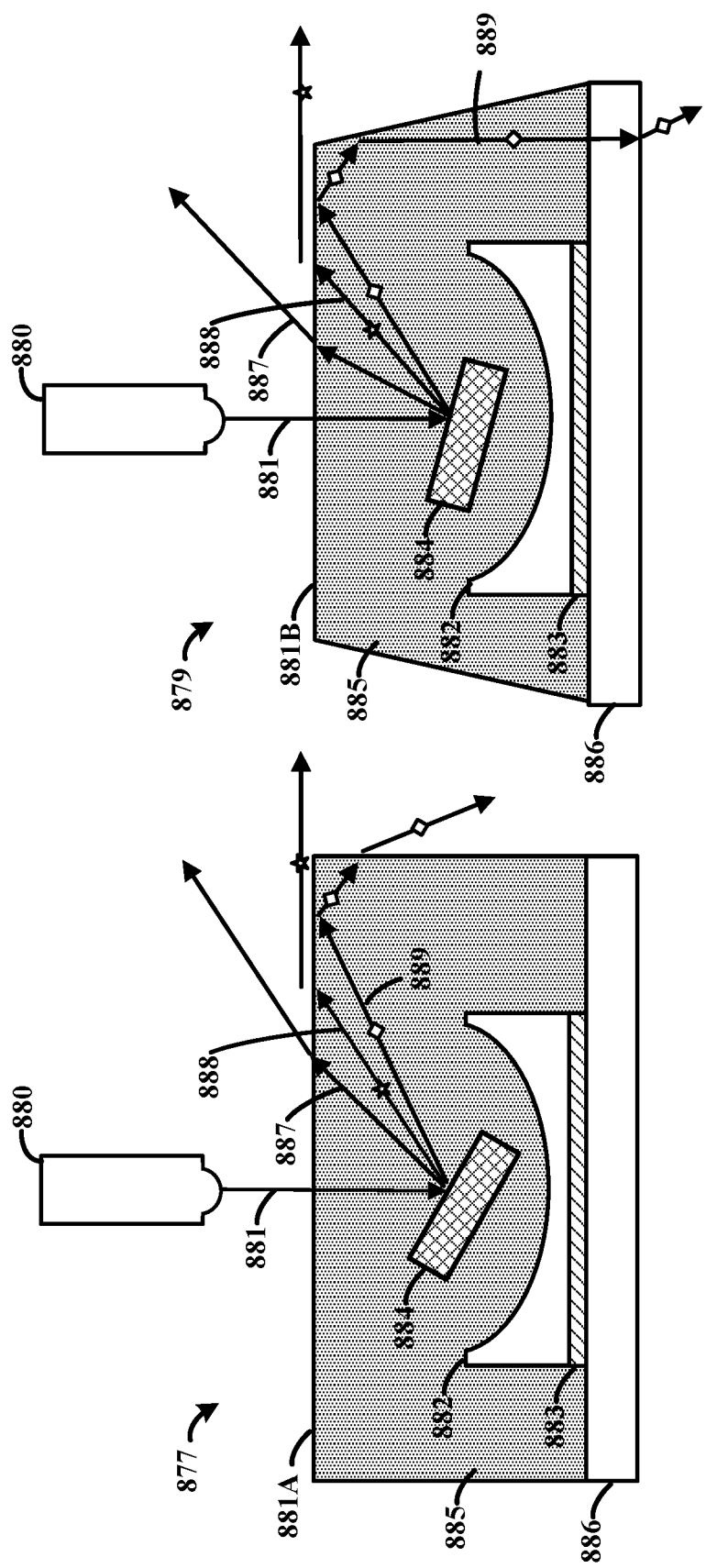

POINTING APPARATUSES AND METHODS INVOLVING MAGNETIC-CONTRAST BEARINGS

BACKGROUND

Controlled pointing of a pointing structure can be used for a variety of implementations. For example, various apparatuses are used to point an optical beam in a particular direction, such as for optical communication. In some specific implementations, gimbals and flexures (e.g., micromechanical (MEMS), galvo type) are used for controlled movement in a pointing apparatus. Example pointing apparatuses can be difficult to scale, are heavy, and can wear out over time.

SUMMARY

The present invention is directed to overcoming the above-mentioned challenges and others related to pointing apparatuses.

Various embodiments of the present disclosure are directed to apparatuses and methods for controlled pointing of a pointing structure using a magnetic-contrast bearing.

Specific embodiments are directed to an apparatus including a pointing structure, a magnetic-contrast bearing, and drive circuitry. The pointing structure is coupled to the magnetic-contrast bearing. The bearing includes a magnetic array and a substrate arranged with the magnetic array. The drive circuitry generates a magnetic field that interacts with the magnetic array and causes control of a pointing position of the pointing structure. More specifically, the magnetic-contrast bearing and drive circuitry can control motion of the pointing structure. The controlled motion can include tilting and/or rotating the position of the pointing structure.

The bearings can be referred to as magnetic-contrast bearings because the medium with higher magnetic susceptibility is pulled magnetically into the region closest to the magnet array, whereas the medium with lower magnetic susceptibility is displaced or pushed away from the magnetic array. In the case of diamagnetic levitation, the diamagnetic material has lower magnetic susceptibility than even vacuum, and is pushed away to provide the levitation force. In the case of levitation with magnetic fluids, the liquid is magnetically attracted to the magnet array more than the lower-susceptibility substrate. The liquid can exert magnetic-induced hydrodynamic forces to push the substrate away rather than pushing directly on the substrate as is the case with diamagnetic levitation. The net magnetic levitation forces are typically the same for the same magnetic susceptibility difference or "contrast" between substrate and medium (including vacuum in the case of diamagnetic levitation).

The magnetic-contrast bearing can be a planar magnetic bearing or a semi-spherical magnetic bearing. The apparatus can further include a semi-spherical substrate coupled to the magnetic array and the pointing structure. The magnetic array includes a plurality of magnets arranged about a convex-curved surface of the semi-spherical substrate. For example, the plurality of magnetics can be arranged in a grid across the convex-curved surface, arranged on the perimeter of the convex-curved surface, and/or covering the entire convex-curved surface and/or portions thereof. As a more specific example, the substrate has a concave semi-spherical surface facing the magnetic array, and the apparatus further includes a semi-spherical substrate coupled to the magnetic array and the pointing structure, wherein the magnetic array is arranged about a curved surface of the semi-spherical substrate, and the magnetic-contrast bearing is a semi-spherical magnetic bearing.

In specific embodiments, the substrate is formed with a diamagnetic material that repels the magnetic array and causes passive levitation of the pointing structure. The diamagnetic material can be selected from a group consisting of: pyrolytic graphite, glass, metal, semiconductor, water, plastics, and combinations thereof. In other embodiments, the apparatus further includes a magnetic fluid arranged about at least a portion of the magnetic-contrast bearing, and the magnetic fluid causes passive levitation of the pointing structure.

The drive circuitry can include an array of traces or coils that are arranged with the magnetic array and a power source to provide current to the array of traces or coils. The apparatus can further include processing circuitry coupled to the drive circuitry. The processing circuitry provides signals to the drive circuitry to control motion of the pointing structure in x, y, and/or z directions, and/or equivalent axes of rotation.

In specific embodiments, the apparatus further includes a light source to output a beam of light toward the pointing structure. The pointing structure can be a reflective surface that reflects the beam of light, and the change in pointing position of the pointing structure causes the reflected beam to output at a particular angle and to a target location, although embodiments are not so limited.

Various-related and more specific embodiments are directed to an apparatus which includes a magnetic-contrast bearing, magnetic fluid, a pointing structure, and drive circuitry. The magnetic-contrast bearing includes a magnetic array and a substrate arranged with the magnetic array. The magnetic fluid surrounds at least a portion of the magnetic-contrast bearing. The pointing structure is coupled to the magnetic-contrast bearing such that the pointing structure levitates. The drive circuitry is coupled to the magnetic-contrast bearing to point the pointing structure in a particular direction via controlled movement of the magnetic-contrast bearing. The drive circuitry can control the movement of the magnetic-contrast bearing by generating a magnetic field that interacts with the magnetic array and causes control of the pointing position of the levitated pointing structure. The drive circuitry can rotate the pointing structure over a $2\pi$ steradian (sr) field of regard. In specific embodiments, the magnetic-contrast bearing causes levitation of the pointing structure in response to the apparatus being in reduced or no power mode. In various embodiments, the pointing structure is selected from the group consisting of: a reflective surface, a light source, an antenna, a magnet, an optical phase array, fiber optics, a receiver circuit, a robot arm (such as a two-dimensional motor for robotics) and a combination thereof.

Other example embodiments are directed to methods of using the above described apparatuses. An example method includes levitating a pointing structure via interaction between the magnetic array and a substrate arranged with the magnetic array, generating a magnetic field that interacts with the magnetic array and causes control of a pointing position of the levitated pointing structure, and pointing the pointing structure in a particular direction based on the pointing position. Generating the magnetic field can include providing signals to drive circuitry coupled to the magnetic-contrast bearing to control motion of the pointing structure in at least one of an x direction, a y direction, and a z direction and/or an equivalent rotation axis (e.g., rotating about an x axis, y axis, and/or z axis). In various embodiments, the method further includes, in response to the control of the pointing position, providing a signal in a particular direction using the pointing structure in the pointing position. The signal can include a reflected beam of light and the method can further include outputting a beam of light toward the pointing structure, and, in response, reflecting the beam of light via the pointing structure, in some specific embodiments.

Embodiments in accordance with the present disclosure include all combinations of the recited particular embodiments. Further embodiments and the full scope of applicability of the invention will become apparent from the detailed description provided hereinafter. However, it should be understood that the detailed description and specific embodiments, while indicating preferred embodiments of the invention, are given by way of illustration only, since various changes and modifications within the spirit and scope of the invention will become apparent to those skilled in the art from this detailed description. All publications, patents, and patent applications cited herein, including citations therein, are hereby incorporated by reference in their entirety for all purposes.

BRIEF DESCRIPTION OF THE DRAWINGS

Various example embodiments can be more completely understood in consideration of the following detailed description in connection with the accompanying drawings, in which:

FIGS. 8A-8B illustrate example pointing apparatuses, in accordance with various embodiments;

Figure 1:
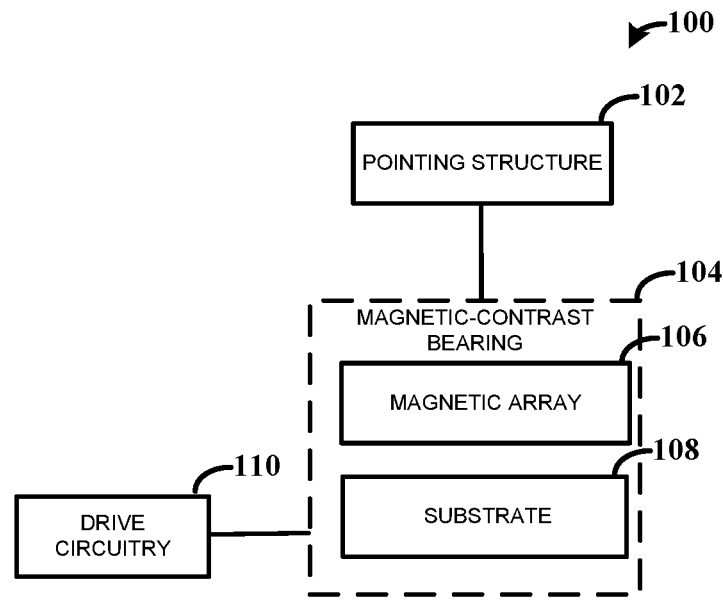
FIG. 1 illustrates an example pointing apparatus, in accordance with various embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of apparatus and methods involving magnet-contrast pointing. The apparatus includes a magnetic-contrast bearing having a magnetic array and a substrate coupled to a pointing structure. The substrate, in specific embodiments, repels the magnetic array thereby causing the pointing structure to levitate and allowing for a range of movement of the pointing structure. In other embodiments, the apparatus further includes magnetic fluid which causes the levitation of the pointing structure. While the present invention is not necessarily limited to such applications, various aspects of the invention may be appreciated through a discussion of various embodiments using this context.

Accordingly, in the following description various specific details are set forth to describe specific embodiments presented herein. It should be apparent to one skilled in the art, however, that one or more other examples and/or variations of these embodiments can be practiced without all the specific details given below. In other instances, well known features have not been described in detail so as not to obscure the description of the embodiments herein. For ease of illustration, the same reference numerals can be used in different diagrams to refer to the same elements or additional instances of the same element.

A number of different types of apparatuses can be used to control a direction of a pointing structure for a variety of applications. For example, controlling a pointing direction of a light beam or an antenna can be used for optical communications, projectors, displays, sensors, robotics, operational and multifunctional satellite vehicle (SV) capabilities, including reconfigurability, flywheel energy storage, angular momentum control, inert object tracking, and other functions. It can be beneficial, for various applications, to develop a pointing apparatus that can be scaled, has high-precision control and degrees of freedom of movement, is lightweight, low power consumption (e.g., has outstanding size, weight, and power (SWaP)), is durable, and has low complexity or a minimal number of parts such that there are less points of failure. Many applications, for example, include difficult or expensive to reach locations, such as space, underwater, or other remote locations and/or can be distributed such that failures of a part in one or in many devices in the overall system is difficult and/or expensive to resolve. Embodiments in accordance with the present disclosure are directed to a pointing apparatus that provides passive magnetic contrast levitation of a pointing structure and uses drive circuitry for driving a pointing direction of the levitated pointing structure. The apparatus provides controlled movement of the pointing structure in a variety of directions, using minimal power, minimal parts, and is scalable to a variety of sizes for different applications.

Specific embodiments in accordance with the present disclosure are directed to a pointing apparatus which includes a magnetic-contrast bearing having a magnetic array and a substrate which interacts with the magnetic array. A pointing structure coupled to the bearing is passively levitated through magnetic interaction with the magnetic array. For example, current running through traces and/or wires of the drive circuitry can generate magnetic fields to tilt and/or point a levitated pointing structure coupled to the magnetic array or substrate.

The pointing apparatus can be suitable for high-precision pointing and can include low-tolerance bearings with zero or near zero wear. The magnetic-contrast bearing can be reliable and typically do not have drag issues such as with conventional bearings. For example, the magnetic-contrast bearing is essentially a film bearing with near-zero force noise. The magnetic-contrast bearing can be used for directing a pointing structure that is scalable, allows for lower power, spin stabilized, allows for pointing structure (e.g., mirror and optical element) swapping, large arrays of pointing structures with sub-micron (μm) control, and electronic-level reliable. The apparatus can include an electromagnet drive system to enable six-degrees of freedom (DOF), high-precision control with high SWaP characteristics. For example, the magnetic-contrast bearing can have no surface contact (e.g., zero wear, zero friction/adhesion), and zero or near-zero power loss even at high speeds. Magnetic-contrast bearings can have no hysteresis, further enhancing precise control. Furthermore, the apparatus uses rigid bodies that can have minimal or no mechanical complexity and are shock-tolerant. The pointing apparatus is driven is by a printed circuit board (PCB), enabling scalability and ease of integration.

Various embodiments are directed to methods of using the above described apparatus and/or computer-readable instructions which are executed to perform methods of using the above described apparatus. Additionally, although a number of embodiments are described herein as an optical communication system, embodiments are not so limited and can include a variety of different apparatuses and/or for implementing different applications.

Turning now to the figures, FIG. 1 illustrates an example of a pointing apparatus, in accordance with various embodiments. The apparatus 100 includes a magnetic-contrast bearing 104, a pointing structure 102, and drive circuitry 110.

The magnetic-contrast bearing 104 is coupled to the pointing structure 102 and includes a magnetic array 106 and a substrate 108. As used herein, a pointing structure includes a physical object which is attached to a portion of the magnetic-contrast bearing 104 such that the physical object moves with controlled movement of the attached portion of the magnetic-contrast bearing 104. The pointing structure 102 points in a particular direction in response to the controlled movement. The controlled movement can be used to provide an output signal, such as providing an output signal from the pointing structure 102 to external circuitry and/or providing an output signal from external circuitry as received by or using the pointing structure 102. Example pointing structures 102 include a reflective surface, a magnet, an antenna, a light source, a robot arm (e.g., two-dimensional or three-dimensional motor for robotics), printed data which can be scanned by external circuitry, a receiver, an optical phase array, and fiber optics, among other physical objects. The magnetic array 106 can include a plurality of magnets. In some embodiments, the magnetic array 106 is attached to the pointing structure 102 and in other embodiments, the pointing structure 102 is attached to the substrate 108. The substrate 108 can be formed of a diamagnetic material or other types of material, as further described herein.

The pointing structure 102 can be coupled to the magnetic-contrast bearing 104 and can levitate in response to a magnetic interaction of the magnetic array 106, such as magnetic interaction between the substrate 108 and/or a magnetic fluid and the magnetic array 106. The levitation can include a passive levitation in which the pointing structure 102 levitates regardless of a power mode of the apparatus 100 due to the interplay of attractive and/or repulsive forces of the substrate 108 and magnetic array 106. For example, the pointing structure 102 can levitate when the apparatus 100 is in a reduced power mode or a no power mode. In embodiments in which the substrate 108 is formed of a diamagnetic material, the substrate 108 repels the magnetic array 106 to levitate the pointing structure 102. In other embodiments, a magnetic fluid surrounds at least a portion of the magnetic-contrast bearing 104. The magnetic fluid can be attracted to the magnetic array 106 such that the magnetic fluid is pulled by the magnetic array 106, causing lift forces on the pointing structure 102. The lift forces cause the pointing structure 102 to levitate. The magnetic fluid can include a ferrofluid or a paramagnetic fluid, as further described herein.

The magnetic-contrast bearing 104 can be a planar magnetic bearing and, in other embodiments, is a semi-spherical magnetic bearing, as further illustrated herein. For a planar magnetic bearing, the magnetic array 106 can be arranged around a perimeter of the pointing structure 102. For a semi-spherical magnetic bearing, the substrate 108 can have a concave semi-spherical surface facing the magnetic array 106. For example, the apparatus 100 can further include a semi-spherical substrate coupled to the magnetic array 106 or the magnetic array 106 may otherwise form a semi-spherical substrate. The magnetic array 106 can be arranged about a curved surface of the semi-spherical substrate which faces the substrate 108.

The drive circuitry 110 of the apparatus 100 generates a magnetic field that interacts with the magnetic array 106 and causes control of the pointing position of the pointing structure 102. For example, the magnetic-contrast bearing 104 and the drive circuitry 110 control motion of the pointing structure 102, with the control of motion and pointing position including tilting and/or rotating the position of the pointing structure 102 via the magnetic array 106 or the substrate 108 coupled thereto. The drive circuitry 110 can include an array of traces or coils arranged with the magnetic array 106, and a power source to provide current to the array of traces or coils. The current provided generates the magnetic field. In various embodiments, the drive circuitry 110 includes a circuit, sometimes referred to as a "drive circuit", that provides the current from the power source to the array of traces or coils. The drive circuit can include a PCB drive circuit, for example. In specific embodiments, the drive circuitry 110 can rotate the pointing structure 102 over a $2\pi$ steradian (sr) field of regard.

The drive circuitry 110 can be coupled to processing circuitry, not illustrated in FIG. 1 (sometimes referred to as "a processor"). The processing circuitry can provide signals to the drive circuitry 110 to control the motion of the pointing structure 102. For example, the signals can cause current to be provided to respective traces or coils of the array and which causes the magnetic field and the associated control of the pointing position of the pointing structure 102. The control of motion can include x, y, and/or z directions and, in some specific embodiments, can include rotation and/or flipping of the pointing structure 102. The processing circuitry can be implemented as a multi-core processor or a processor circuit implemented as a set of processor circuits integrated as a chip set. The processing circuitry can include a single, or multiple computer circuits including memory circuitry for storing and accessing the firmware or program code to be accessed or executed as instructions to perform the related operation(s).

As noted above, the current provided to the drive circuitry 110 causes generation of a magnetic field that interacts with the magnetic array 106. The levitated pointing structure 102 coupled to the magnetic array 106 or the substrate 108 is moved responsive to the magnetic field which pushes and/or pulls respective magnets of the magnetic array 106 in a direction. The array of traces or coils of the drive circuitry 110 can be arranged with the magnetic array 106 such that that the traces or coils can control the movement in the x, y, and/or z directions and/or an equivalent rotation axis, such as rotating about an x axis, y axis, and/or z axis. In specific embodiments, a sub-set of the traces or coils are arranged in the x direction and are used to control the x direction movement, and a sub-set of the traces or coils are arranged in the y direction and are used to control the y direction movement, and the z direction movement is controlled by different combinations of the traces or coils. Different magnitudes of current can be provided to different traces or coils of the array at specific times, which generates different magnetic fields at different locations of the respective traces or coils. The different magnetic fields can push and/or pull the magnetic array 106 in a controlled manner.

In specific embodiments, the drive circuitry 110 includes a multi-layer PCB with the traces or coils arranged in two independent patterns. Each of the two independent patterns can be a set of parallel traces or coils connected in series and which drive movement of the pointing structure 102 in a respective direction. At least a first layer of the PCB includes traces or coils that drive movement in a first direction, such as the x direction, and at least a second layer of the PCB includes traces or coils that drive movement in a second direction, such as the y direction. Embodiments are not limited to two layer PCBs, and more than one layer of the PCB can include traces or coils that drive a respective direction. In such embodiments, as the traces or coils are in layers, to exert the same magnetic field or force by the different layers, a magnitude of current provided to a first layer which is arranged closer to the magnetic array 106 can be less than a magnitude of current provided to a second layer which is arranged farther from the magnetic array 106 than the first layer.

As a more specific and related example of controlled motion, assume the PCB includes four layers. The first two layers are used to drive movement in the x direction and the second two layers are used to drive movement in the y direction. In the example, to exert the same force by each of the four layers, current of a magnitude of 0.25 amps (A) is provided to the first layer that is used to control the x direction, current of a magnitude of 0.33 A is provided to the second layer that is used to control the x direction, current of a magnitude of 0.5 A is provided to the third layer that is used to control the y direction, and current of a magnitude of 0.7 A is provided to the fourth layer that is used to control the y direction. For the two layers which control movement of a respective direction, a quadrature drive is used in which a trace or traces in one of the two layers are driven like a cosine, and a trace or traces in the other layer of the two layers are driven ninety degrees out of phase, e.g., like a sine. For example, to control movement of the pointing structure 102 in the x direction, traces of the first two layers of the PCB are driven by (0.25 cosine (2πft), 0.33 sine (2πft)), where f is the drive frequency that determines the speed and t is the time, and ft determines the distance the pointing structure 102 is to travel. Currents are held when motion is to be stopped. As shown by the example, the cosine and sine are multiplied by the current amplitudes for the respective layer that the traces are in, which can prevent or mitigate the forces being stronger or weaker in respective layers of the PCB. Different forces in the layers can result in jerky motion. Driving the y direction is similar in the particular example, and includes traces being driven in the third and fourth layers of the PCB, and the cosine and sine are multiplied by 0.5 A and 0.7 A respectively. As may be appreciated, the above is provided as an example, and embodiments are not limited to the four layers or the amplitudes of currents are described.

In various embodiments, the drive can be digitized to form a step driver (e.g., cosines and sines are rounded to −1 or +1). In such an example, the pointing structure 102 can make discrete steps, such as 0.5 mm. In other embodiments, the motion can stop anywhere between steps using the full cosines and sines. As an example, processing circuitry can identify how to move between two points in the most efficient or fastest way. The processing circuitry identifies how to accelerate and decelerate from a given position, with the acceleration being around half the time and the deceleration being around the other half of the time, and with the trace or coil currents being held in the final position. The processing circuitry can tune the currents to find the optical values for the fastest movement (e.g., by brute force, trying many different test currents, saving the optimal currents, and reiterating the process). For more general and specific information an driving currents for controlled movement, reference is made to "Diamagnetically Leviated Robots: An Approach to Massively Parallel Robotic System with Unused Motion Properties", R. Pelrine et al., 2012 *IEEE International Conference on Robotics and Automation*, Saint Paul, MN, 2012, pp. 739-744; and to "Optimal Control of Diamagnetically Levitated Milli Robots Using Automated Search Patterns", R. Pelrine et al., 2016 *International Conference on Manipulation, Automation and Robotics at Small Scales (MARSS)*, Paris, 2016, pp. 1-6; each of which are fully incorporated herein by reference for their general and specific teachings.

The controlled movement and pointing position of the pointing structure 102 can be used to point the pointing structure 102 in a particular direction. The drive circuitry 110 is coupled to the substrate 108 and arranged with the magnetic array 106 to point the pointing structure in a particular direction via the control of the magnetic-contrast bearing 104. In specific embodiments, the pointing structure 102 includes a mirror and a light beam is directed toward the mirror and reflects based on the pointing position. The change in the pointing position of the pointing structure 102, as controlled by the drive circuitry 110, causes the reflected beam to output at the particular angle and/or to a target location. In such embodiments, the apparatus 100 can include a light source that outputs the beam of light toward the pointing structure 102. The reflective surface is arranged with the light source to reflect the beam of light. Although examples are not so limited and a variety of different types of pointing structure 102 can be used.

In a number of embodiments, via suitable magnetic biasing, the pointing structure 102 leviates and may not drift away, whether or not power is provided to the apparatus 100. With a semi-spherical magnetic bearing, gravity can provide the suitable magnetic biasing, assuming the concave portion of the magnetic-contrast bearing 104 is upright. In such embodiments, the levitated portion of the magnetic-contrast bearing 104 can move around in the concave portion of the magnetic-contrast bearing 104 when there is no power on (so long as the center of mass of the levitated portion is not too high to tip over the concave portion). In space and/or on earth, whether using a semi-spherical or planar magnetic bearing, an additional magnetic structure can be used to provide the suitable magnetic biasing. The magnetic array 106 is attracted to the additional magnetic structure, such as another magnet or piece of steel. In the event the magnetic array 106 coupled to the pointing structure 102 starts to drift away, the magnetic array 106 is attracted by the additional magnetic structure which pulls the magnetic array 106 back.

The diamagnetic and/or magnetic fluid forces engage to levitate the pointing structure 102 once the magnetic array 106 is close. The magnetic biasing dominates forces at large gaps to attract the magnetic array 106 and the diamagnetic and/or fluid forces dominate at small gaps to repel and leviate the pointing structure 102.

In accordance with a number of embodiments, the magnetic-contrast bearing 104 can provide pointing stability and open-loop repeatability, such as of 20 microradian (gad) root mean square (rms) The magnetic-contrast bearing 104 can provide pointing stability and speed due to low force noise, which allows for use in tracking applications with fast control. Mechanical power loss can be negligible, enabling high-speed spin stabilization. In specific embodiments, the pointing apparatus 100 can be used to provide high precision, low SWaP pointing and can be implemented on a variety of scales. The pointing apparatus 100 can provide a pointing angle of plus and/or minus approximately thirty-five degrees in two-dimensions and the magnetic-contrast bearing 104 can be less than one centimeter (cm) in size. Although examples are not so limited and embodiments allow for flexibility in design scale for different applications.

Figure 2A:
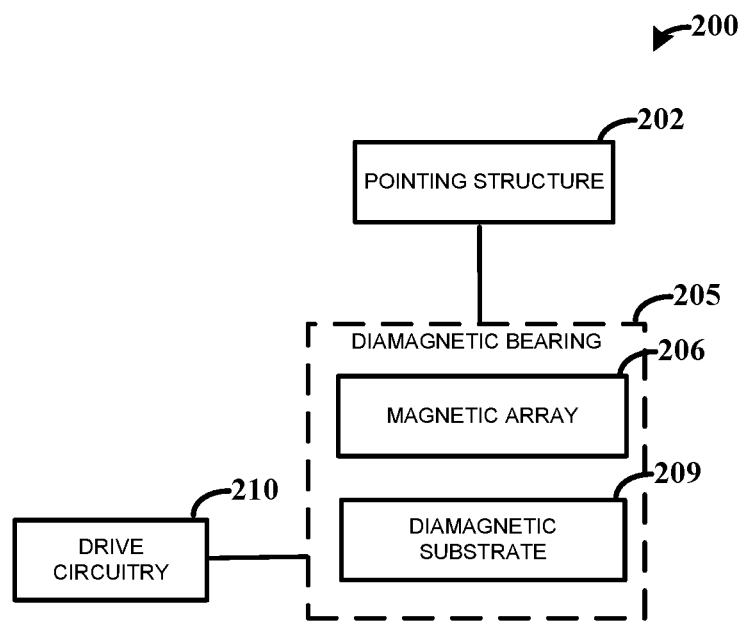
FIG. 2A-2B illustrate example pointing apparatuses, in accordance with various embodiments.
Figure 2B:
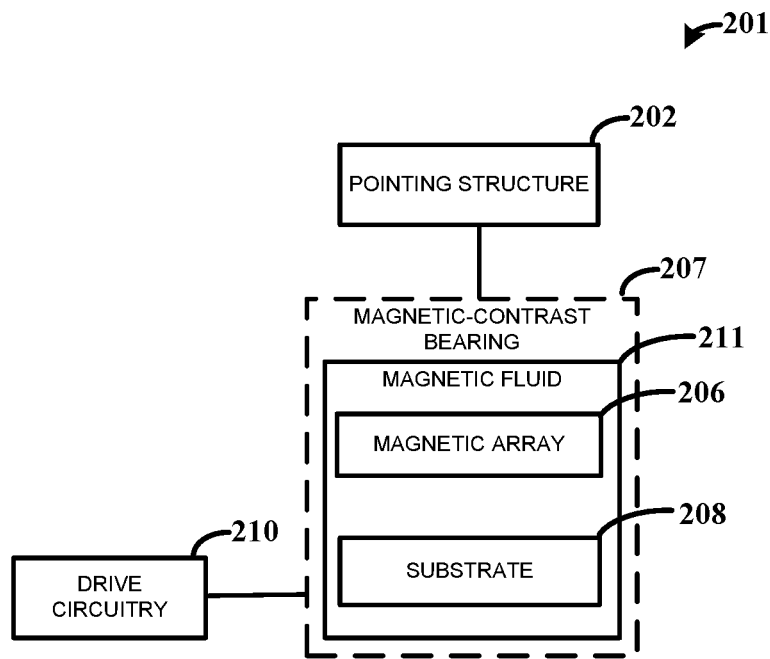

FIGS. 2A-2B illustrates specific example pointing apparatuses, in accordance with various embodiments. The pointing apparatus 200 of FIG. 2A is similar to the pointing apparatus of FIG. 1, except that the magnetic-contrast bearing is a diamagnetic bearing 205. In particular, FIG. 2A illustrates an example apparatus 200 which includes a diamagnetic bearing 205, a pointing structure 202, and drive circuitry 210.

The diamagnetic bearing 205 includes a magnetic array 206 and a substrate 209. The magnetic array 206 is coupled to the pointing structure 202 and can be arranged in a variety of ways, as previously described and further illustrated herein. The magnetic array 206 can include a plurality of magnets attached to the pointing structure 202. In some embodiments, the magnetic array 206 consists of a plurality of magnets with alternating polarity and/or magnetization direction in the manner of a checkerboard. In other embodiments, the pointing structure 202 is attached to the substrate 209. The pointing structure 202 can include a reflective surface, such as one or more mirrors formed of acrylic and/or glass. Although embodiments are not so limited, and other materials can form the reflective surface, such as a liquid, polished anodized, aluminum, mylar and/or the pointing structure 202 can include other structures such as an antenna, a light source, a magnet, etc.

In the embodiment of FIG. 2A, the substrate 209 is formed of a diamagnetic material, which is sometimes herein be referred to as "a diamagnetic substrate". The diamagnetic material can include pyrolytic graphite, glass, metal, semiconductor, water, plastics, and combinations thereof. The substrate 209 is arranged with the magnetic array 206 such that the diamagnetic material interacts with the magnetic array 206 and causes the pointing structure 202 to levitate. For example, the diamagnetic material repels the magnetic array 206 and causes passive levitation of the pointing structure 202, as previously described. In some specific embodiments, as further illustrated herein, the apparatus 200 can further include magnetic fluid arranged about the diamagnetic bearing 205 and/or portions thereof.

Similar to the apparatus 100 illustrated by FIG. 1, the diamagnetic bearing 205 can be a planar bearing and/or a semi-spherical bearing, as further illustrated herein. For a planar diamagnetic bearing, the magnetic array 206 can be arranged around a perimeter of the pointing structure 202.

For the semi-spherical diamagnetic bearing, the apparatus 200 can include a semi-spherical substrate coupled to the magnetic array 206 and the pointing structure 202. In such embodiments, the magnetic array 206 can include a plurality of magnets arranged about a convex-curved surface of the semi-spherical substrate. Alternatively and/or in addition, the substrate 208 formed of the diamagnetic material has a concave semi-spherical surface facing the magnetic array 206. The semi-spherical substrate can be coupled to the magnetic array 106 and the pointing structure 202. The magnetic array 206 can be arranged about a curved surface of the semi-spherical substrate. For example, the plurality of magnetics can be arranged in a grid across the convex-curved surface, arranged on the perimeter of the convex-curved surface, and/or covering the entire convex-curved surface and/or portions thereof.

As previously described, the drive circuitry 210 of the apparatus 200 can generate a magnetic field that interacts with the magnetic array 206 and causes control of a pointing position of the pointing structure 202. The drive circuitry 210 can be coupled to processing circuitry, not illustrated in FIG. 2. The processing circuitry can provide signals to the drive circuitry 210 to control the motion of the pointing structure 202.

The pointing apparatus 201 of FIG. 2B is similar to the pointing apparatus of FIG. 1, except that the magnetic fluid 211 surrounds at least a portion of the magnetic-contrast bearing 207. In particular, FIG. 2B illustrates an example apparatus 201 which includes a magnetic-contrast bearing 207, a pointing structure 202, and drive circuitry 210.

The magnetic-contrast bearing 207 includes a magnetic array 206 and a substrate 208, and is coupled to the pointing structure 202. In some embodiments, the magnetic array 206 is coupled to the pointing structure 202 and can be arranged in a variety of ways, as previously described. The magnetic array 206 can include a plurality of magnets attached to the pointing structure 202. In other embodiments, the pointing structure 202 is attached to the substrate 208. The substrate 208 can be formed of a diamagnetic material or other types of material, such as plastic or other polymers, silicon, glass. Metals, such as copper, which are nearly magnetically inert can be used, so long as the magnetic susceptibility of the metal is below that of the magnetic fluid 211. The substrate 208 can include a metal substrate which is used to provide eddy current damping of the magnetic array 206, which can inhibit oscillations using some control methods. The magnetic fluid 211 can be a ferrofluid or a paramagnetic liquid, such as manganese sulfate or manganese nitrate solution in water. The magnetic fluid 211 surrounds at least a portion of the magnetic array 206 and optionally other portions of the magnetic-contrast bearing 207. For example, the magnetic fluid 211 may be below the magnetic array 206, such as between the magnetic array 206 and the substrate 208. The substrate 208 can be formed of any type of material that has a magnetic susceptibility which is lower than the magnetic susceptibility of the magnetic fluid 211. The substrate 208 can act diamagnetically relative to the magnetic fluid 211 even when the substrate 208 is not formed of a diamagnetic material. Although not illustrated, the apparatus 201 can further include a housing that surrounds the magnetic-contrast bearing 207. The housing can be formed of a variety of materials that have a lower magnetic susceptibility than the magnetic fluid 211. Example materials include polymers, silicon, and glass.

The magnetic fluid 211 can include a ferrofluid or a paramagnetic fluid, such as a paramagnetic salt solution. A ferrofluid can strongly magnetize in the presence of a magnetic field. As used herein, a ferrofluid includes or refers to a colloidal suspension of magnetic particles in a fluid. Example magnetic particles include iron oxide and/or salts (e.g., iron II chloride and iron III chloride). A paramagnetic fluid (which is sometimes herein interchangeably referred to as a "paramagnetic liquid") includes or refers to colloidal suspension of magnetic particles in a liquid, in which the magnetic ions are weakly magnetic. Weakly magnetic includes a magnetic permeability of around one. A paramagnetic salt solution can be weakly attracted by the magnetic field and can form internal induced magnetic fields in the direction of the applied magnetic field. Ferrofluids are typically stronger magnetically (e.g., higher magnetic susceptibility) than paramagnetic fluids, but ferrofluids can be diluted to have lower susceptibility down to zero. While ferrofluids are stronger magnetically, the particles can agglomerate under some conditions (and under such conditions, the ferrofluid may not act like a liquid if there is too much agglomeration). Paramagnetic fluids are weaker magnetically but may not agglomerate (e.g., as they are true solutions). As the magnetic fluid 211 has a higher magnetic susceptibility than the substrate 208, and the optional housing, the magnetic fluid 211 is pulled toward the magnetic array 206 causing lift forces on the pointing structure 202 and resulting in levitation of the pointing structure 202.

Figure 3:
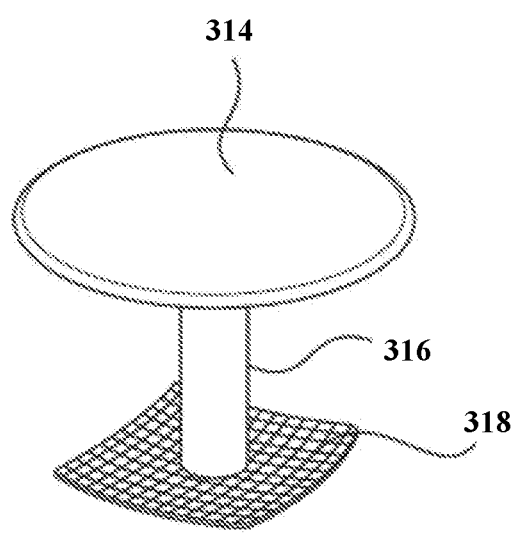
FIG. 3 illustrates an example magnetic array and pointing structure, in accordance with various embodiments.

FIG. 3 illustrates an example magnetic array and pointing structure, in accordance with various embodiments. The magnetic array 318 and pointing structure, which is a reflective surface 314 in the particular embodiment, can form part of a semi-spherical diamagnetic bearing, as described above in connection with FIG. 2A.

As shown by FIG. 3, the reflective surface 314 is coupled to the magnetic array 318, in the specific embodiment, by a cylindrical attachment 316. However, embodiments are not so limited and the reflective surface 314 can be directly coupled to the magnetic array 318, or is coupled by multiple structures and/or different shaped structures.

The magnetic array 318 includes a plurality of magnets arranged in an array. The array, in the particular embodiment, forms a curved surface or is otherwise arranged about a curved surface. In some examples, the magnetic array 318 is arranged about or forms a semi-spherical substrate. As further illustrated by FIGS. 4A-4B, a convex curved surface of the magnetic array 318 can be arranged with a concave semi-spherical surface of the substrate of the bearing.

Figure 4A:
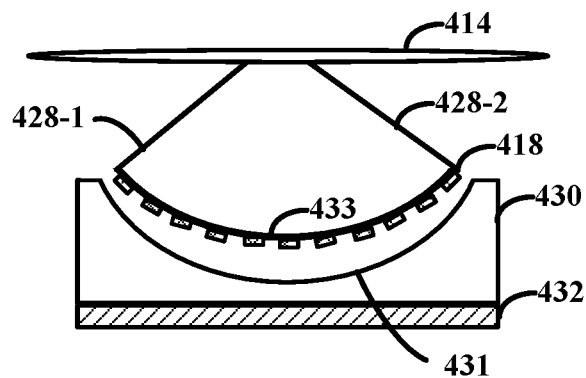
FIGS. 4A-4B illustrate an example diamagnetic bearing, in accordance with the present disclosure.
Figure 4B:
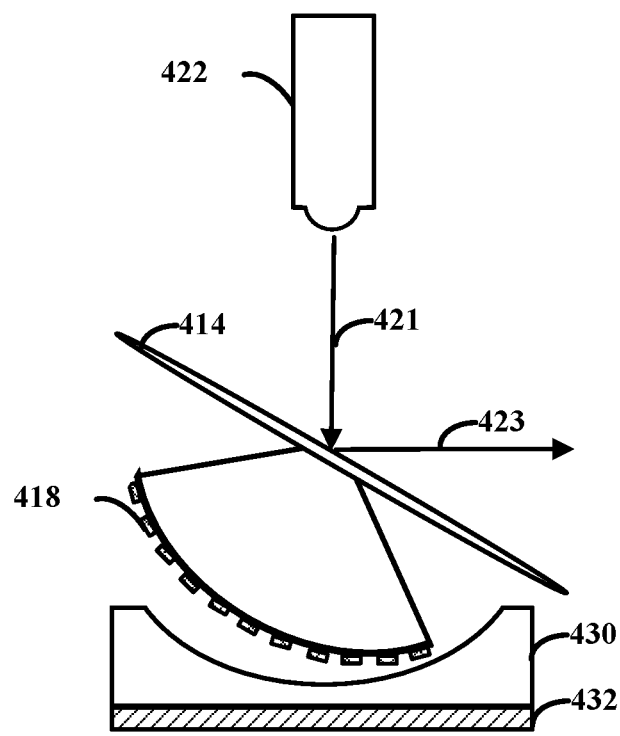

FIGS. 4A-4B illustrate an example diamagnetic bearing, in accordance with the present disclosure. The diamagnetic bearing can include the magnetic array 418 coupled to a reflective surface 414 and a substrate 430 formed of the diamagnetic material as previously described in connection with FIG. 3, with another example embodiment of attaching the magnetic array 418 to the reflective surface 414 via the structures 428-1, 428-2. The spherically shaped diamagnetic bearing rotates the reflective surface 414 and can reflect a beam over a $2\pi$ sr field of regard (FOR).

As shown by FIG. 4A, the magnetic array 418 includes a plurality of magnets arranged in an array on or forming a semi-spherical substrate. The magnets are formed on a convex curved surface 433 of the semi-spherical substrate and face the substrate 430 formed of the diamagnetic material. The substrate 430 has a concave semi-spherical surface 431 facing the magnetic array 418. The magnetic array is repelled from the substrate 430 formed of the diamagnetic material, causing the reflective surface 414 to levitate.

Drive circuitry 432 is coupled to the substrate 430 and arranged with the magnetic array 418 to generate a magnetic field that interacts with the magnetic array 418 and causes control of a pointing position of the reflective surface 414. As shown by FIG. 4B, the magnetic field generated by the drive circuitry 432 interacts with the magnetic array 418 and causes control of the pointing position of the reflective surface 414, such that the reflective surface 414 can point a reflective beam of light in a particular direction.

More specifically, FIG. 4B illustrates an example of controlling the diamagnetic bearing illustrated by FIG. 4A to point a reflected beam of the light 423 in the particular direction. As shown, a light source 422 outputs a beam of light 421 toward the reflective surface 414. The reflective surface 414 is arranged with the light source 422 to reflect the beam of light, herein referred to as the reflected beam of light 423. The reflected beam of light 423 is pointed in a particular direction via the control of the diamagnetic bearing, as previously described (e.g., via the magnetic array 418, the substrate 430 and the drive circuitry 432).

Figure 5A:
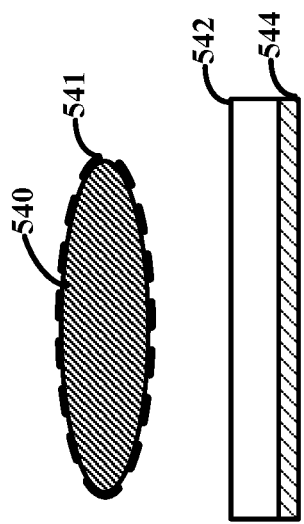
FIGS. 5A-5B illustrate another example diamagnetic bearing, in accordance with various embodiments.
Figure 5B:
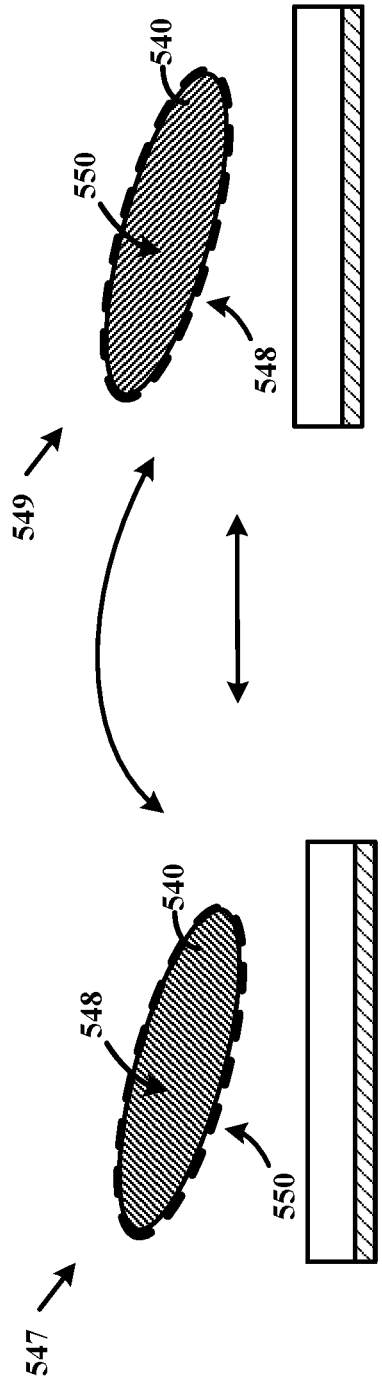

FIGS. 5A-5B illustrate another example diamagnetic bearing, in accordance with various embodiments. The diamagnetic bearing is planar and includes a magnetic array 541 arranged with a substrate 542 formed of diamagnetic material, as described above. The diamagnetic material repels the magnetic array 541 to levitate the reflective surface 540.

As shown by FIG. 5A, the magnetic array 541 includes a plurality of magnets arranged around the perimeter of the reflective surface 540. However, embodiments are not so limited and the magnetic array 541 can be differently arranged. As previously described, drive circuitry 544 is coupled to the substrate 542 and interacts with the magnetic array 541 to control the pointing position of the reflective surface 540.

FIG. 5B illustrate an example of controlled movement of a diamagnetic bearing, such as the diamagnetic bearing illustrated by FIG. 5A, in accordance with the present disclosure. More specifically, FIG. 5B illustrates an example of flipping the reflective surface 540 such that, at 547, a first side 548 of the reflective surface 540 is facing up, and through controlled movement of the reflective surface 540, at 549, a second side 550 of the reflective surface 540 is facing up. Although the controlled movement of the reflective surface 540 is not so limited, and can include a variety of x, y, z, and/or tilt movements.

Although the embodiments of FIGS. 3-5B illustrate pointing apparatuses with reflective surfaces coupled to magnetic arrays, embodiments are not so limited. Various embodiments can include different pointing structures and/or the pointing structure coupled to the substrate, with the substrate being levitated and the magnetic array being stationary.

Figure 6:
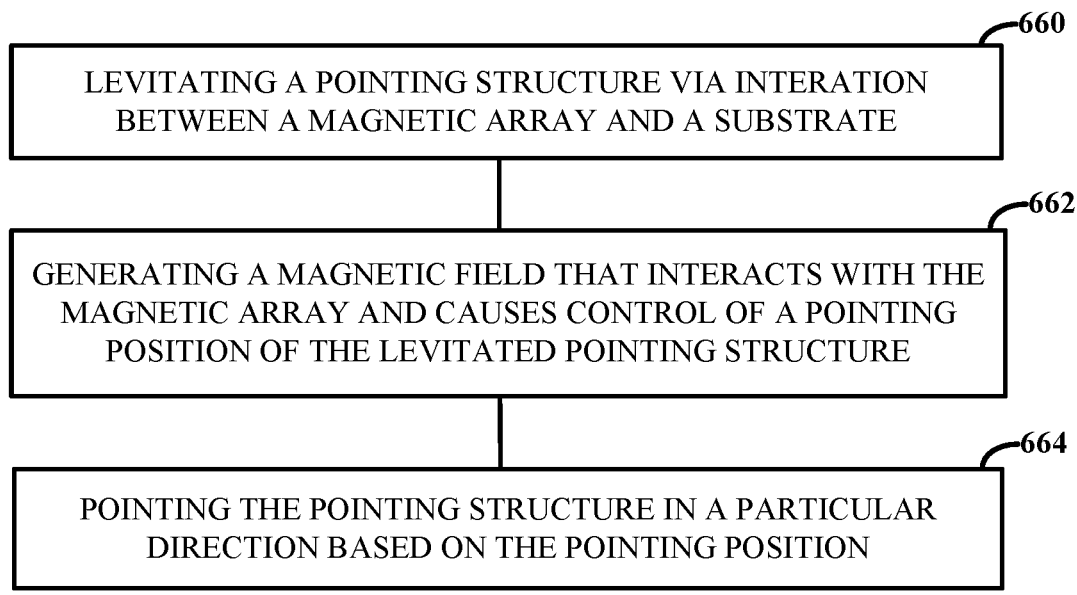
FIG. 6 illustrates an example method of controlling movement of a magnetic-contrast bearing, in according with the present disclosure.

FIG. 6 illustrates an example method of controlling movement of a magnetic-contrast bearing, in according with the present disclosure.

The method includes, at 660, levitating a pointing structure coupled to a magnetic-contrast bearing via interaction between a magnetic array and a substrate, wherein the magnetic array and the substrate form the magnetic-contrast bearing. At 662, the method further includes generating a magnetic field that interacts with the magnetic array and causes control of a pointing position of the levitated pointing structure. In specific embodiments, generating the magnetic field includes providing signals to drive circuitry coupled to the magnetic-contrast bearing to control motion of the pointing structure in at least one of an x direction, a y direction, and a z direction. At 664, the method includes pointing the pointing structure in a particular direction based on the pointing position. The method can further include providing a signal in the particular direction using the pointing structure in the pointing position. For example, the signal can include a reflected beam of light which is reflected in the particular direction based on the pointing position of a reflective surface. Reflecting a beam of light can further include outputting a beam of light toward the reflective surface, and, in response, reflecting the beam of light via the reflective surface. In other embodiments, the signal includes a beam of light which is emitted by a light source in the particular direction based on the pointing position of a light source. As another example, the signal includes a magnetic field which is output in the particular direction by a magnet or includes a data signal output by an antenna. In other embodiments, the pointing structure is used to receive an input signal from external circuitry.

Figure 7:
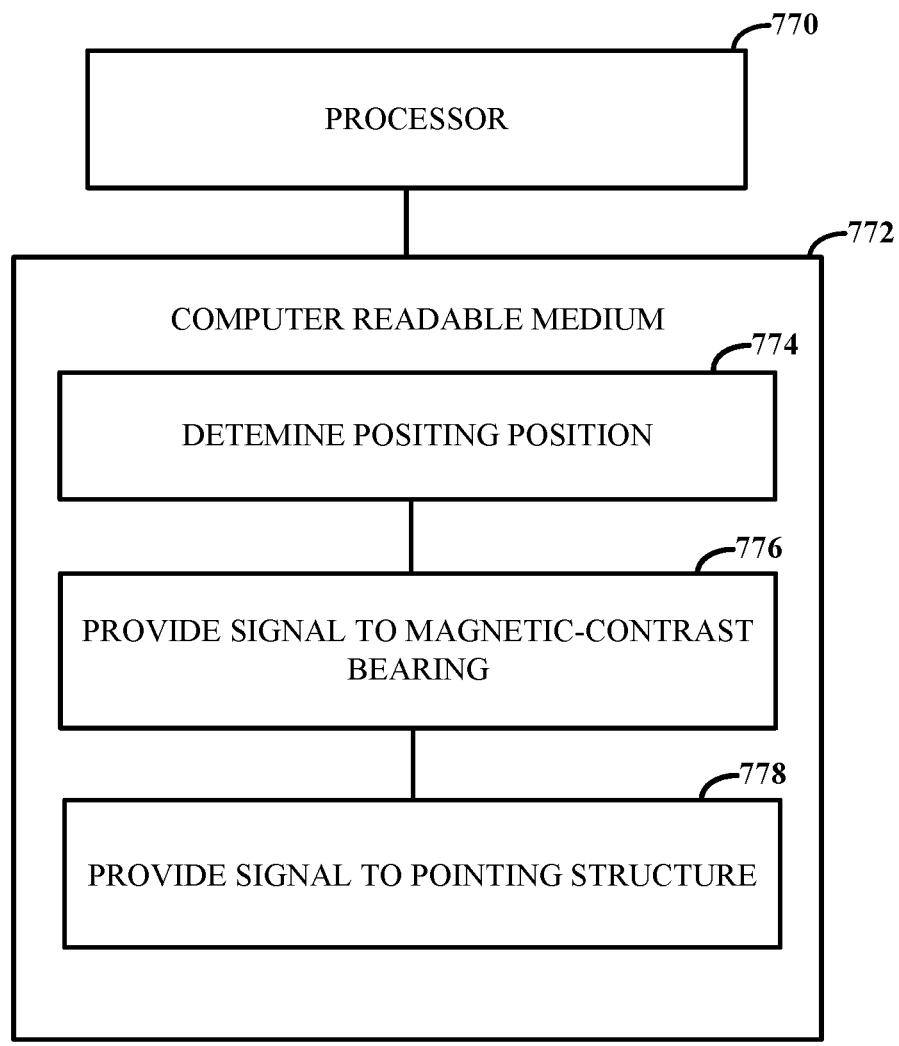
FIG. 7 illustrates an example computing device, in accordance with various embodiments.

FIG. 7 illustrates an example computing device, in accordance with various embodiments. The computing device includes processing circuitry in communication with drive circuitry of a pointing apparatus, such as illustrated by FIG. 1. The computing device has processing circuitry, such as the illustrated processor 770, and computer readable medium 772 storing a set of instructions 774, 776, 778. The non-transitory computer readable medium 772 can, for example, include read-only memory (ROM), random-access memory (RAM), electrically erasable programmable read-only memory (EEPROM), Flash memory, a solid state drive, and/or discrete data register sets. The computing device illustrated by FIG. 7 can form part of the apparatus having the magnetic-contrast bearing, such as the processor 770 providing signals to the drive circuitry as illustrated by FIG. 1.

The computing device can be used to control a pointing position of a pointing structure coupled to a magnetic-contrast bearing. For example, at 774, the computing device determines a pointing position of the pointing structure. The pointing position can depend on the particular application, and/or can be based on communication from external circuitry. Based on the pointing position, at 776, the computing device provides a signal to drive circuitry coupled to the magnetic-contrast bearing. The signal is indicative of a magnitude and/or location of current to provide to the array of traces or coils of the drive circuitry to generate the magnetic field which causes the pointing structure to move to the pointing position. This process can be repeated to repetitively control the pointing position of the pointing structure. In some specific embodiments, at 778, the computing device provides another signal to circuitry coupled to the pointing structure and/or to a light source to output a beam of light toward the reflective surface. However, embodiments are not so limited and the pointing structure can be controlled separately and/or can always output the light beam. In further alternative embodiments, the different output types of output signal are provided, such as radio waves or other communication signals and/or are received.

FIGS. 8A-8B illustrate example diamagnetic pointing apparatuses, in accordance with various embodiments. Each of the apparatuses 877, 879 include a diamagnetic bearing formed by a magnetic array coupled to the reflective surface, generally referred to as the "levitated reflective surface 884" and the diamagnetic substrate 882 coupled to drive circuitry 883. Each of the diamagnetic bearings are surrounded by a housing 881A, 881B and formed on another substrate 886. The housing 881A, 881B can be filled with a magnetic fluid 885, such as a ferrofluid or a paramagnetic fluid as previously described. The magnetic fluid 885 can attract toward the magnetic array. The diamagnetic substrate 882, by contrast, is repelled by the magnetic field and formed induced magnetic fields in the opposite direction of the applied magnetic field.

The drive circuitry 883 is used to control a pointing position of the levitated reflective surface 884, and to optionally control a reflected beam of light 887. The light source 880 outputs the light beam 881 toward the levitated reflective surface 884, which is reflected at the particular angle depending on the pointing position of the reflective surface 884. As shown by FIGS. 8A-8B, additional reflections of the light beam can occur depending on the angle of the reflective surface 884. For example, the arrows with stars 888 illustrate a beam of light reflected below the critical angle for total internal reflection. The arrows with diamonds 889 illustrate a reflected beam of light which is internally reflected and exits the housing 881A, 881B at a refracted angle from the side of the house 881A in FIG. 8A and is double internal reflected out the bottom of the housing 881B in FIG. 8B. In either embodiment, the apparatus 877, 879 can achieve $2p$ sr pointing using total internal reflection.

MORE DETAILED/EXPERIMENTAL EMBODIMENTS

Various embodiments are directed to pointing apparatuses that include a magnetic-contrast bearing which self-levitates a portion of the bearing due to magnetic interactions between the levitating portion and the non-levitating portion. The levitating portion can include a pointing structure coupled to a magnetic array. The non-levitating portion can include a substrate which repels the magnetic array and causes the reflective surface to levitate. Although embodiments are not so limited, and can include a levitated substrate being coupled to the pointing structure and/or use of magnetic fluid for levitation. Drive circuitry is coupled to the substrate and is used to control the pointing position of the apparatus. The pointing apparatuses can be used for a variety of applications. Example applications include optical communications, which can be on Earth, underwater, and/or in space, projectors, displays such as three-dimensional (3D) displays, scanners or sensors (e.g., Light Detection and Ranging (LIDAR)), robotics, automobiles, biological cell manipulation, surgical instruments, among other applications. In specific example implementations, the pointing apparatus can be used in satellite communications and/or portable optical communications.

Various components described herein have been tested for application in space. In specific embodiments, the drive circuitry is a PCB or discrete coils. For space applications, PCB or discrete coils have been flown in space on missions and have technology readiness rating (TRL) ratings of 9. Drivers using vacuum rated PCBs for a scanning electron microscope (SEM) operation have been successfully designed, confirming that PCB drivers can be used. The electronics for the drivers can include or be similar to electric motor drivers, which are TRL 9 on space missions.

The diamagnetic bearing, in specific embodiments, includes shaped pyrolytic graphite and rare earth magnets, both with relatively loose tolerances because the bearing has loose tolerances. Diamagnetic bearings have been operated in hard vacuum, and have been tested diamagnetic bearings in a charging environment inside a SEM.

Pyrolytic graphite has been flown in space, as have rare earth magnets. Although a diamagnetic bearing has not been flown in space, the bearing uses space-rated materials that have. It can be estimated that 0.001 g is experienced during operation due to spacecraft drag, and example bearings scale favorably with lower ambient acceleration. It can be approximated that roughly 10 g vibration during launch (non-operating condition) and it has been demonstrated that shocks over 100 g's with the bearing returning to its levitated state. It is estimated that diamagnetic bearings for space applications are at TRL 5. Table 1 shows estimated SWaP parameters for the subsystems of an example apparatus described below.

TABLE 1

Summary of SWaP for a specific example of a diamagnetic pointing system

| Subsystem | Size (cm) | Weight (g) | Power (W) | Comment |
|---|---|---|---|---|
| Mirror drive | 10 × 10 × 10 | 300 | 1 | Includes mirror (200 grams (g)), structure, and PCB driver |
| Diamagnetic bearing | 7 × 10 × 0.1 | 35 | 0 | Assumes electronic damping; modest increase in mass if copper/aluminum eddy current damping used |

Diamagnetic bearings are based on the phenomena whereby diamagnetic materials are repelled by magnetic fields and permanent magnets. There are many types of diamagnetic materials, including insulating glasses, metals, semiconductors, water and plastics. An example material for diamagnetic bearings is pyrolytic graphite, which has high anisotropic (negative) susceptibility. On Earth, it can be difficult to self-levitate on millimeter scales of thickness with any material besides graphite. Embodiments on Earth may include the use of pyrolytic graphite as the diamagnetic material, and optionally include use of a ferrofluid, although embodiments are not so limited. Self-levitate means without a larger-scale magnetic, electrostatic, or buoyancy bias force to offset gravity. In space at 0.001 g residual accelerations, any diamagnetic material or permanent magnet array can self-levitate. The difference between the best diamagnetic material (pyrolytic graphite) and other material like water, common glasses, and silicon, is roughly a factor of 40.

Pyrolytic graphite can be used in various example diamagnetic bearing designs. This material exerts the maximum bearing pressure with rare earth permanent magnets and has low eddy current losses due to its relatively high resistivity (5×10-6 ohm-m). Other diamagnetic materials such as glass and quartz have resistivities 20 orders of magnitude higher than graphite, which exhibit bearing pressure of roughly 1/40th lower. All these materials can be used for space bearings. For practical purposes, these apparatuses can be lossless.

Diamagnetism itself is perfectly elastic. Current estimates based on recoil permeability analysis of the second order effects on rare earth magnets are that current bearings are perfectly elastic to about 1 parts per million (ppm), making them sensor-grade bearings comparable to flexures but with full range rotations and unlimited translations in the plane of the bearing (mobility).

Magnetic field and field gradients generated by PCB traces or discrete wire coils are used for the drive force/torque, which is extremely linear in current. Trace current, and therefore drive force/torque, can be controlled to roughly 1 part in 10,000. Current levitated systems use a stepper motor design with extremely fine micro-stepping. If one assumes translational resolution of 100 nm rms as demonstrated on Earth, then the open-loop angular resolution, with a 5 cm distance to the center of rotation, is 2 μrad rms, well below the 10 μrad pointing used for various specific applications. Various experimental embodiments demonstrate closed-loop servo control with higher linear resolution.

FIGS. 4A-4B and 5A-5B respectfully show two different diamagnetic bearing embodiments. All mirrors are assumed to have a thin constraining outer structure (not shown) for error conditions. The mirror does not drift off, even with zero power using suitable magnetic biasing. Both designs can be made from millimeter to meter scales or larger. The planar diamagnetic bearing, illustrated by FIGS. 5A-5B is feasible because little area is used in low g. The semi-spherical diamagnetic bearing illustrated by FIGS. 4A-4B shows a design using a segment of a spherical cavity (see Table 2). Manufacturing for the curved magnet array and graphite is TRL 8-9. Additional capabilities, such as much faster pointing, can be realized with multi-mirror arrays.

TABLE 2

Estimated values of the mirror system and their relation to data rate and range.

| Parameter | Nominal values | Comments on Effects on Data Rate/Range |
|---|---|---|
| FOR | 2π sr | Larger FOR potential |
| Aperture | 10 cm | Influences data rate relative to noise; larger apertures have less spreading and longer range with higher bit rates, but a finer beam causes longer search times |
| Mass | 335 grams | Dominated by mirror mass; affects rate for link acquisition |
| Size | 10 × 10 × 11 cm | Determined mainly by aperture |
| Power | 1 Watt (W) | A factor in scan speed for link acquisition; tracking power is low <0.1 W |
| Point-to-point time | ~70 millisecond (ms) | Time between any two points in the sky; Settling to 0.1%; affects link acquisition times in some search methods; decreases with aperture size and pulse power methods |
| Scan rate | Up to ~2000 radian per second (rad/s) | Limited by structural/safety spin speeds; Much lower speed scanning (~100 rad/s) are practical but this is the expected peak speed available |
| Mechanical jitter | <100 nanometer (nm) rms | Could affect data rate; nominal value is below inherent diffraction spreading so not expected as an issue |
| Operating lifetime | Unlimited | No wear; data rate and range eventually go to zero for all systems with wear; data rate and range may be degraded long before then in systems with wear |

Figure 9B:
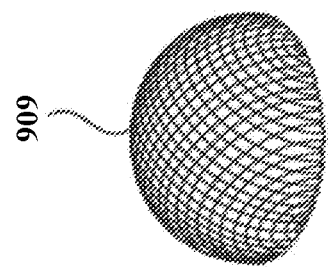
FIGS. 9A-9B illustrate a specific example of a pointing apparatus, in accordance with various embodiments.
Figure 9A:
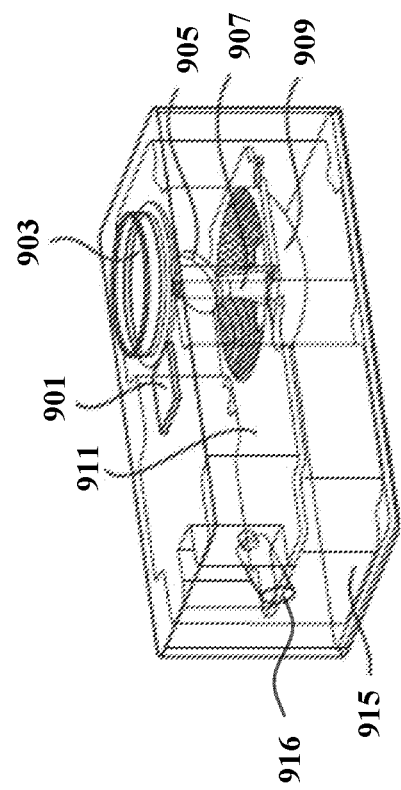

FIGS. 9A-9B illustrate a specific example of a pointing apparatus, in accordance with various embodiments. The apparatus is similar to that illustrated by FIGS. 8A-8B and include a diamagnetic bearing formed by a mirror 905 and a mirror positioner 907 which includes the magnetic array coupled directly the mirror 905 and a diamagnetic substrate which repels the magnetic array and causes the mirror 905 to levitate. The apparatus further includes drive circuitry that includes the spherical driver 909 and the PCB or flex drive circuit 911. The spherical driver 909 is further illustrated by FIG. 9B and is composed of a plurality of wires formed in a semi-spherical array. The PCB or flex drive circuit 911 provides current to the spherical driver 909 which causes the generation of the magnetic field and control of the pointing position of the mirror 905, as previously described. The apparatus further includes a fixed mirror 901. For example, light may enter from the housing 915 where there is a cylindrical element 916 (e.g., a laser or fiber optics). The light can bounce off the fixed mirror 901 and reflect off mirror 905. The fixed mirror 901 can thereby direct light beam to hit the mirror at a target angle.

In various specific embodiments, the diamagnetic bearing is used as part of an optical communication system. The system can provide for fast linking and object acquisition over a range of approximately 1000 kilometers (km) or greater. A housing 915 surrounds the diamagnetic bearing and various circuitry, and a glass lens 903 can be arranged with the housing 915 to allow a light beam to reflect or emit out toward a target. Although embodiments are not so limited and can include a number of variations as noted above.

Figure 10A:
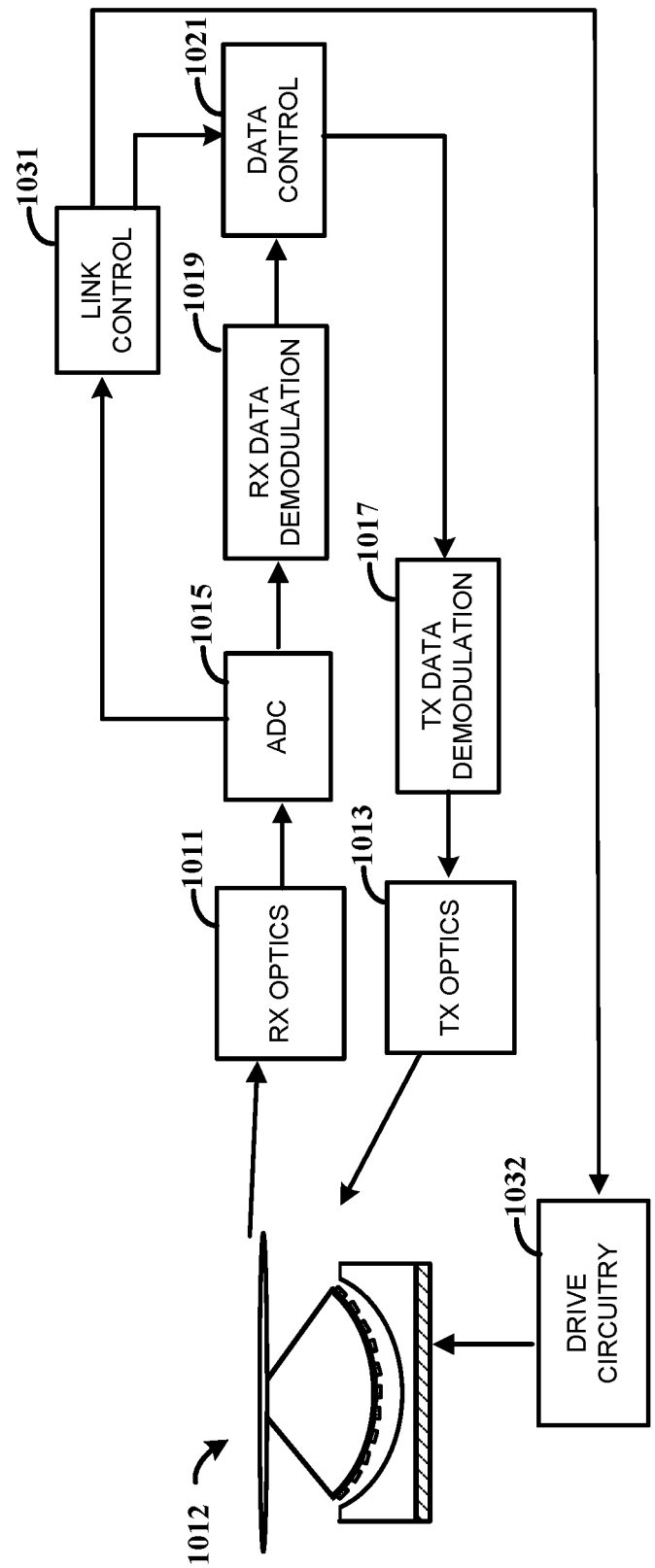
FIGS. 10A-10B illustrate example optical communication systems which use a pointing apparatus, in accordance with various embodiments.
Figure 10B:
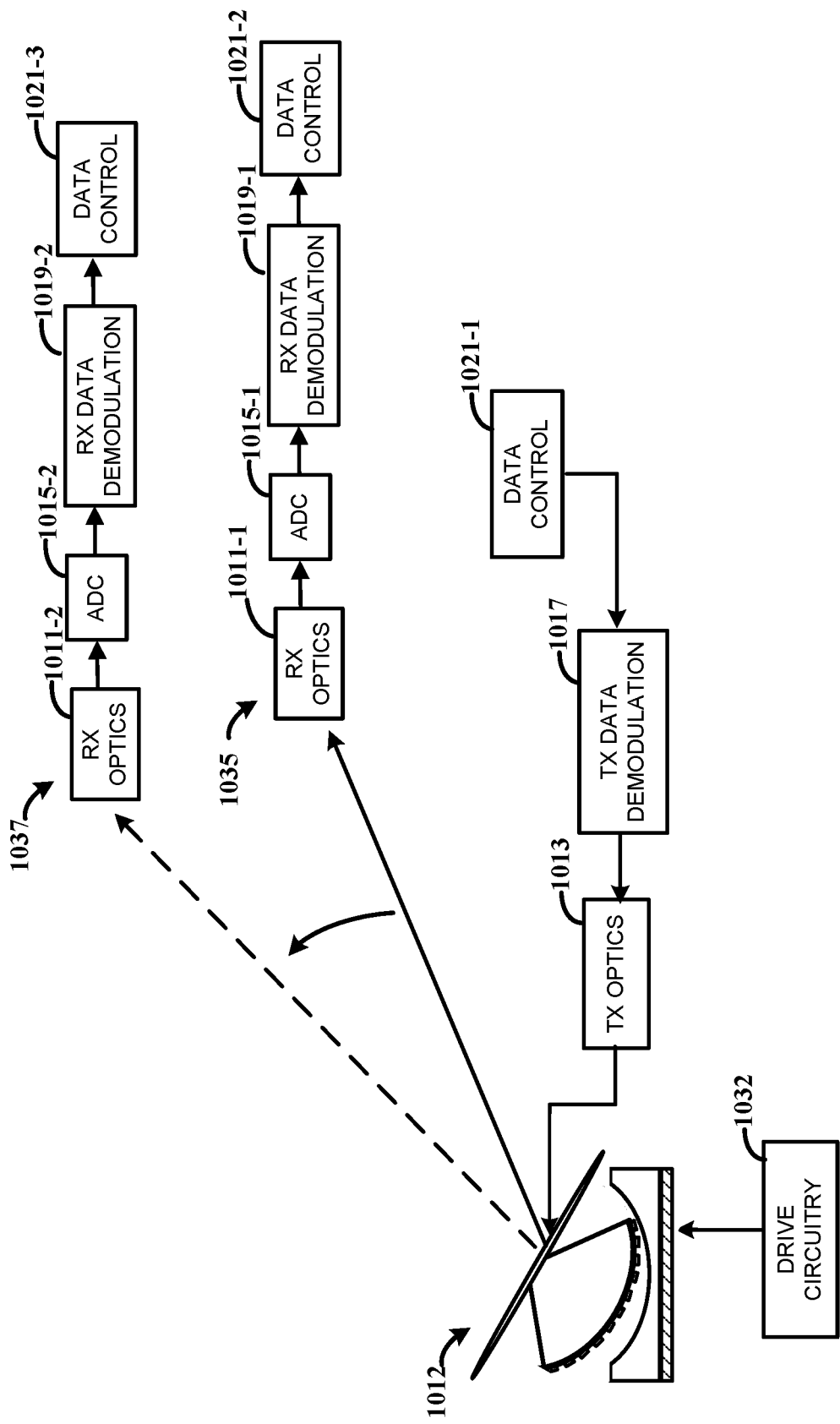

FIGS. 10A-10B illustrate example optical communication systems which use a pointing apparatus, in accordance with various embodiments. More specifically, FIG. 10A illustrates an example system which includes a pointing apparatus 1012 having a diamagnetic bearing (e.g., a magnetic array and diamagnetic substrate), a levitating reflective surface, and drive circuitry 1032 (e.g., the traces or coils coupled to the PCB or drive circuit) as previously described. Data can be received from other external circuitry using receiver (RX) optics circuitry 1011, an analog-to-digital converter (ADC) circuit 1015, an RX data demodulation circuit 1019, and a data control circuit 1021 (e.g., processing circuitry and memory circuit). The link control circuit 1031 can include circuitry to set the communication link, such as identifying the pointing position of the levitated reflective surface and providing control signals to the drive circuitry 1032 for driving current to generate the magnetic field that cause the reflective surface of the pointing apparatus 1012 to move to the pointing position. Similarly, data can be transmitted to external circuitry using transmitter (TX) optics circuitry 1013, the TX data demodulation circuit 1017 and the data control circuit 1021.

FIG. 10B illustrates another example system which includes a pointing apparatus 1012 having a diamagnetic bearing (e.g., a magnetic array and diamagnetic substrate), a levitating reflective surface, and drive circuitry 1032 (e.g., the traces or coils coupled to the PCB or drive circuit) as previously described. The pointing apparatus 1012 includes a transmitter including TX optics circuitry 1013, a TX data demodulation circuit 1017 and a data control circuit 1021-1, as previously described in connection with FIG. 10A. Although not illustrated, the pointing apparatus 1012 further includes the link control circuit, such as illustrated by FIG. 10A, and which provides control signals to the drive circuitry 1032 to cause the levitated reflective surface to change pointing positions. The levitated reflective surface can change pointing positions, for example, to provide a data communication to different RX devices 1035, 1037. Each of the RX devices 1035, 1037 include RX optics circuitry 1011-1, 1011-2, an ADC circuit 1015-1, 1015-2, an RX data demodulation circuit 1019-1, 1019-2 and a data control circuit 1021-2, 1021-3 (e.g., processing circuitry and memory circuit). Although not illustrated, the pointing apparatus 1012 and/or the RX devices 1035, 1037 can further include RX or TX circuitry, as previously described.

In a variety of embodiments, the magnet array is comprised of a plurality of small magnets that are bonded together with an adhesive to form an magnetic array. In other embodiments, the magnetic array can be patterned onto a single magnetic substrate in the manner of the magnetic patterns on a disk drive. In further embodiments, the magnetic array can be a single magnet. A single magnet may be susceptible to unwanted rotations about its magnetic dipole axis because the driving magnetic fields typically cannot control the orientation about the dipole axis of a single magnet.

Various embodiments are implemented in accordance with the underlying Provisional Application (Ser. No. 62/836,854), entitled "Diamagnetic Pointing System," filed Apr. 22, 2019, to which benefit is claimed and which is fully incorporated herein by reference for their general and specific teachings. For instance, embodiments herein and/or in the provisional application can be combined in varying degrees (including wholly). Reference can also be made to the experimental teachings and underlying references provided in the underlying Provisional Application. Embodiments discussed in the Provisional Application are not intended, in any way, to be limiting to the overall technical disclosure, or to any part of the claimed disclosure unless specifically noted.

Although described or shown with respect to one embodiment, the features and elements so described or shown can apply to other embodiments. It will also be appreciated by those of skill in the art that references to a structure or feature that is disposed "adjacent" another feature can have portions that overlap or underlie the adjacent feature. Additionally, although various embodiments describe imaging of a sample, embodiments are not so limited and can include imaging of whole or partial objects, such as for use in three-dimensional imaging or printing and/or for in-field images of particular objects and/or portions thereof.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and can be abbreviated as"/".

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which can be illustrated as or using terms such as blocks, modules, device, system, unit, controller, and/or other circuit-type depictions (e.g., reference numerals 110, 210 of FIGS. 1-2B depict a block/module). Such circuits or circuitry are used together with other elements to exemplify how certain embodiments can be carried out in the form or structures, steps, functions, operations, activities, etc. For example, in certain of the above-discussed embodiments, one or more modules are discrete logic circuits or programmable logic circuits configured and arranged for implementing these operations/activities, as can be carried out in the approaches shown in FIG. 6. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described at FIG. 7 is used by the programmable circuit to perform the related steps, functions, operations, activities, etc. Depending on the application, the instructions can be configured for implementation in logic circuitry, with the instructions (whether characterized in the form of object code, firmware or software) stored in and accessible from a memory (circuit).

Various embodiments described above, can be implemented together and/or in other manners. One or more of the items depicted in the present disclosure can also be implemented separately or in a more integrated manner, or removed and/or rendered as inoperable in certain cases, as is useful in accordance with particular applications. In view of the description herein, those skilled in the art will recognize that many changes can be made thereto without departing from the spirit and scope of the present disclosure.

What is claimed is:

1. An apparatus comprising:
a pointing structure;
a magnetic-contrast bearing including:
a magnetic array coupled to the pointing structure;
a semi-spherical substrate coupled to the magnetic array and the pointing structure, wherein the magnetic array is arranged about a curved surface of the semi-spherical substrate; and
a substrate arranged with the magnetic array, wherein the substrate has a semi-spherical surface facing the magnetic array and repels the magnetic array to levitate the pointing structure and wherein the semi-spherical surface and the semi-spherical substrate coupled to the magnetic array face one another; and
drive circuitry to generate a magnetic field that interacts with the magnetic array and causes control of a pointing position of the pointing structure.

2. The apparatus of claim 1, wherein the drive circuitry is to control motion of the pointing structure, the control of motion and pointing position including tilting and rotating the position of the pointing structure via the magnetic array coupled thereto and wherein the substrate and magnetic array interact to repel one another and to levitate the pointing structure, and the substrate is separate from and uncoupled to the magnetic array and the pointing structure.

3. The apparatus of claim 1, wherein the substrate is formed of a diamagnetic material that repels the magnetic array and causes passive levitation of the pointing structure with at least one of no power and low power applied by the drive circuitry.

4. The apparatus of claim 3, wherein:
the passive levitation of the pointing structure includes the substrate being unconnected to the magnetic array and the pointing structure; and
the diamagnetic material is a material selected from a group consisting of: pyrolytic graphite, glass, metal, semiconductor, water, plastics, and combinations thereof.

5. The apparatus of claim 1, further including a magnetic fluid arranged about at least a portion of the magnetic-contrast bearing, the magnetic fluid to cause passive levitation of the pointing structure.

6. The apparatus of claim 1, wherein:
the drive circuitry is to generate the magnetic field that interacts with the magnetic array and causes the pointing structure to flip from a first side of the pointing structure facing up to a second side of the pointing structure facing up.

7. The apparatus of claim 1, further including a semi-spherical substrate coupled to the magnetic array and the pointing structure, wherein the magnetic array includes a plurality of magnets arranged about a convex-curved surface of the semi-spherical substrate.

8. The apparatus of claim 1, wherein the semi-spherical surface is a concave semi-spherical surface facing the magnetic array, wherein the concave semi-spherical surface and the semi-spherical substrate coupled to the magnetic array face one another and do not contact one another, and the pointing structure is passively levitated independent of power being provided to the apparatus.

9. The apparatus of claim 1, wherein the drive circuitry includes an array of traces or coils that are arranged with the magnetic array and a power source to provide current to the array of traces or coils, and which generates the magnetic field.

10. The apparatus of claim 1, further including processing circuitry coupled to the drive circuitry, the processing circuitry to provide signals to the drive circuitry to control motion of the pointing structure in x, y, and z directions.

11. The apparatus of claim 1, further including a light source to output a beam of light toward the pointing structure, the pointing structure including a reflective surface to reflect the beam of light, and the control in pointing position of the pointing structure causes the reflected beam of light to output at a particular angle and to a target location.

12. An apparatus comprising:
a magnetic-contrast bearing including:
a magnetic array;
a semi-spherical substrate coupled to the magnetic array, wherein the magnetic array is arranged about a curved surface of the semi-spherical substrate; and
a substrate arranged with the magnetic array, wherein the substrate has a semi-spherical surface facing the magnetic array and wherein the semi-spherical surface and the semi-spherical substrate coupled to the magnetic array face one another;
magnetic fluid surrounding at least a portion of the magnetic-contrast bearing;
a pointing structure coupled to the magnetic-contrast bearing, wherein the substrate repels the magnetic array such that the pointing structure levitates; and
drive circuitry coupled to the magnetic-contrast bearing to point the pointing structure in a particular direction via controlled movement of the magnetic-contrast bearing.

13. The apparatus of claim 12, wherein:
the magnetic array is coupled to the pointing structure;
the substrate being separate from and unconnected to the pointing structure, and wherein the magnetic fluid and the magnetic array interact to cause lifting force, such that the pointing structure levitates; and
the drive circuitry is to control movement of the magnetic-contrast bearing includes generating a magnetic field that interacts with the magnetic array and causes control of a pointing position of the levitated pointing structure.

14. The apparatus of claim 12, wherein the drive circuitry is coupled to the magnetic-contrast bearing to rotate the pointing structure over a steradian (sr) field of regard.

15. The apparatus of claim 12, wherein the magnetic-contrast bearing is to cause levitation of the pointing structure in response to the apparatus being in reduced or no power mode.

16. The apparatus of claim 12, wherein the pointing structure is selected from the group consisting of:
   a reflective surface, a light source, an antenna, a magnet, an optical phase array, fiber optics, a receiver circuit, and a combination thereof;
   wherein the-semi-spherical surface is a concave semi-spherical surface facing the magnetic array; and
   wherein the concave semi-spherical surface and the semi-spherical substrate coupled to the magnetic array face one another and do not contact one another, and the pointing structure is passively levitated independent of power being provided to the apparatus.

17. A method comprising:
   levitating a pointing structure via interaction between a magnetic array and a substrate arranged with the magnetic array, wherein the magnetic array and the substrate form a magnetic-contrast bearing comprising:
      the magnetic array coupled to the pointing structure; and
      a semi-spherical substrate coupled to the magnetic array and the pointing structure, wherein the magnetic array is arranged about a curved surface of the semi-spherical substrate and wherein the substrate has a semi-spherical surface facing the magnetic array and repels the magnetic array to levitate the pointing structure and the semi-spherical surface and the semi-spherical substrate coupled to the magnetic array face one another;
   generating a magnetic field, via drive circuitry, that interacts with the magnetic array and causes control of a pointing position of the levitated pointing structure; and
   pointing the pointing structure in a particular direction based on the pointing position.

18. The method of claim 17, wherein:
   the substrate being separate from and unconnected to the magnetic array and pointing structure, wherein levitating the pointing structure via the interaction of the magnetic array and substrate comprises the substrate repelling the magnetic array and causing passive levitation of the pointing structure; and
   the method further including, in response to the control of the pointing position, providing a signal in the particular direction using the pointing structure in the pointing position.

19. The method of claim 18, wherein the signal includes a reflected beam of light and the method further outputting a beam of light toward the pointing structure, and, in response, reflecting the beam of light via the pointing structure;
   wherein the-semi-spherical surface is a concave semi-spherical surface facing the magnetic array; and
   wherein the concave semi-spherical surface and the semi-spherical substrate coupled to the magnetic array face one another and do not contact one another, and the pointing structure is passively levitated independent of power being provided thereto.

20. The method of claim 17, wherein generating the magnetic field includes providing signals to drive circuitry coupled to the magnetic-contrast bearing to control motion of the pointing structure in at least one of an x direction, a y direction, and a z direction.

* * * * *